United States Patent [19]

Hitomi et al.

[11] Patent Number: 4,774,812
[45] Date of Patent: Oct. 4, 1988

[54] TURBOCHARGED ENGINE

[75] Inventors: Mitsuo Hitomi; Fumio Hinatase; Kazuaki Umezono; Hidetoshi Nobumoto, all of Hiroshima, Japan

[73] Assignee: Mazda Motor Corporation, Japan

[21] Appl. No.: 846,918

[22] Filed: Apr. 1, 1986

[30] Foreign Application Priority Data

Apr. 8, 1985 [JP] Japan .................................. 60-74054
May 28, 1985 [JP] Japan ................................ 60-115100
May 31, 1985 [JP] Japan ................................ 60-119452
May 31, 1985 [JP] Japan ................................ 60-119453
May 31, 1985 [JP] Japan ................................ 60-119454

[51] Int. Cl.$^4$ .......................................... F02B 33/44
[52] U.S. Cl. ......................................... 60/611; 60/601
[58] Field of Search ........................ 60/600, 601, 611; 123/564

[56] References Cited

U.S. PATENT DOCUMENTS

4,150,545  4/1979  Yamazaki ............................. 60/611
4,207,743  6/1980  Ecomard et al. ..................... 60/611
4,434,775  3/1984  Yoshimura et al. ............... 60/611 X
4,551,977 11/1985  Matsumura ........................... 60/611

Primary Examiner—Stephen F. Husar
Attorney, Agent, or Firm—Gerald J. Ferguson, Jr.

[57] ABSTRACT

In a turbocharged engine, a bypass passage bypassing the impeller of the turbocharger is provided in the intake system to be opened and closed by a bypass valve. A flow control valve is provided in the intake system on the intake side or discharge side of the impeller. During heavy load operation of the engine, the bypass valve is closed and the flow control valve is opened so that all intake air flows through the impeller of the turbocharger. On the other hand, during light load operation of the engine, the bypass valve is opened and the flow control valve is partly closed so that the ratio of the pressure in the intake system downstream of the impeller to the pressure in the intake system upstream of the impeller is set near the surging line but below the same.

12 Claims, 10 Drawing Sheets

TURBOCHARGED ENGINE

BACKGROUND OF THE INVENTION

1. Field of the Invention

This invention relates to a turbocharged engine provided with a supercharger comprising a turbine disposed in the exhaust passage and an impeller disposed in the intake passage.

2. Description of the Prior Art

In turbocharged engines, there has been a problem of lag in the increase in the turbine rpm (turbo lag) during acceleration due to the inertia of the rotating parts. Especially, at low speeds and light loads, the rpm of the rotating part is very low because of low energy of exhaust gas, and when abrupt acceleration of the vehicle is attempted from this condition, the lag in increase of the turbine rpm is considerable and accordingly the lag in increase of the supercharging pressure or the engine output is large, limiting the acceleration performance. If a small turbocharger is used in which the mass of the rotating parts is small in order to reduce the inertia of the rotating parts, the supercharging capacity in the high-speed ranges becomes insufficient, significantly reducing the engine output.

In U.S. Pat. No. 4,207,743, there is disclosed a turbocharged engine which is provided with a bypass passage bypassing the impeller of the turbocharger and in which the intake side or the discharge side of the impeller is closed and the bypass passage is opened when the engine load is light. Thus, in the turbocharged engine, intake air is introduced into the combustion chamber through the bypass passage under intake vacuum without reducing the turbine rpm so that the impeller rpm can be immediately increased when the engine is to be accelerated, thereby reducing the turbo lag.

However, the turbocharged engine is disadvantageous in that since the intake side or the discharge side of the impeller is completely closed during light load operation, the turbo characteristic is apt to exceed the surging line, generating abnormal noises or rotating the turbine in the reverse direction, thereby adversely affecting the durability of the turbocharger.

SUMMARY OF THE INVENTION

In view of the foregoing observations and description, the primary object of the present invention is to provide a turbocharged engine in which the turbine rpm can be kept high during light load operation of the engine without adversely affecting durability of the turbocharger, thereby reducing turbo lag upon acceleration and improving acceleration response.

In accordance with the present invention, a bypass passage bypassing the impeller of the turbocharger is provided in the intake system to be opened and closed by a bypass valve. A flow control valve is provided in the intake system on the intake side or discharge side of the impeller. During heavy load operation of the engine, the bypass valve is closed and the flow control valve is opened so that all intake air flows through the impeller of the turbocharger. On the other hand, during light load operation of the engine, the bypass valve is opened and the flow control valve is partly closed so that the ratio of the pressure in the intake system downstream of the impeller to the pressure in the intake system upstream of the impeller is set near the surging line but below the same.

Generally, the turbine rpm for a given amount of exhaust gas increases as the ratio of the pressure downstream of the impeller to the pressure upstream of the impeller increases, and accordingly, by throttling the intake side or discharge side passage of the impeller, the turbine rpm can be increased. The intake air requirement while the intake side or the discharge side of the impeller is throttled can be satisfied by opening the bypass passage since the engine load is light. Further, since the intake side or the discharge side of the impeller is not completely closed but is partly closed so that said pressure ratio does not exceed the surging line, the durability of the turbocharger is not adversely affected.

It is preferred that the flow control valve be fully opened and the bypass valve be closed irrespective of the engine load when the temperature of the engine coolant is lower than a predetermined value, i.e., when the engine is being warmed up. This is advantageous in that intake air is pressurized by the impeller and heats up before being introduced into the combustion chamber whereby the warm-up time is shortened.

When the engine load is light, the amount of exhaust gas for driving the turbine is small and accordingly the turbine rpm cannot be kept sufficiently high to the extent that the turbine rpm can be satisfactorily quickly increased in response to operation of the accelerator. Therefore, during acceleration, it is preferred that the flow control valve be kept partly closed with the bypass valve opened until the amount of intake gas is increased and the turbine rpm is sufficiently increased.

When the engine speed is high while the engine load is light, the turbine rpm is sufficiently high and the effect of throttling the intake side or the discharge side of the impeller is not remarkable. Accordingly, it is preferred that the flow control valve and the bypass valve both be opened during light-load high-speed operation of the engine so that the flow speed of the intake air is increased to enhance the inertia thereof. This is preferable to improve acceleration response from a light-load, high-speed range.

Further, it is preferred that the intake side or the discharge side of the impeller not be throttled immediately after the beginning of deceleration since if the intake side or the discharge side is throttled immediately after beginning of deceleration when the turbine rpm remains high and the air flow through the bypass passage is not sufficient, said pressure ratio is abruptly increased, causing the turbo characteristic to exceed the surging line, while in addition the amount of air to the impeller is abruptly reduced.

BRIEF DESCRIPTION OF THE DRAWINGS

FIG. 11 is a view of the second embodiment similar to FIG. 5, FIGS. 12A to 12C are views respectively illustrating changes in the throttling degree of the flow control valve, the opening of the bypass valve and the intake pressure downstream of the impeller in the case of the embodiment together with changes of the same items in the case of a control.

DESCRIPTION OF THE PREFERRED EMBODIMENTS

Figure 1:
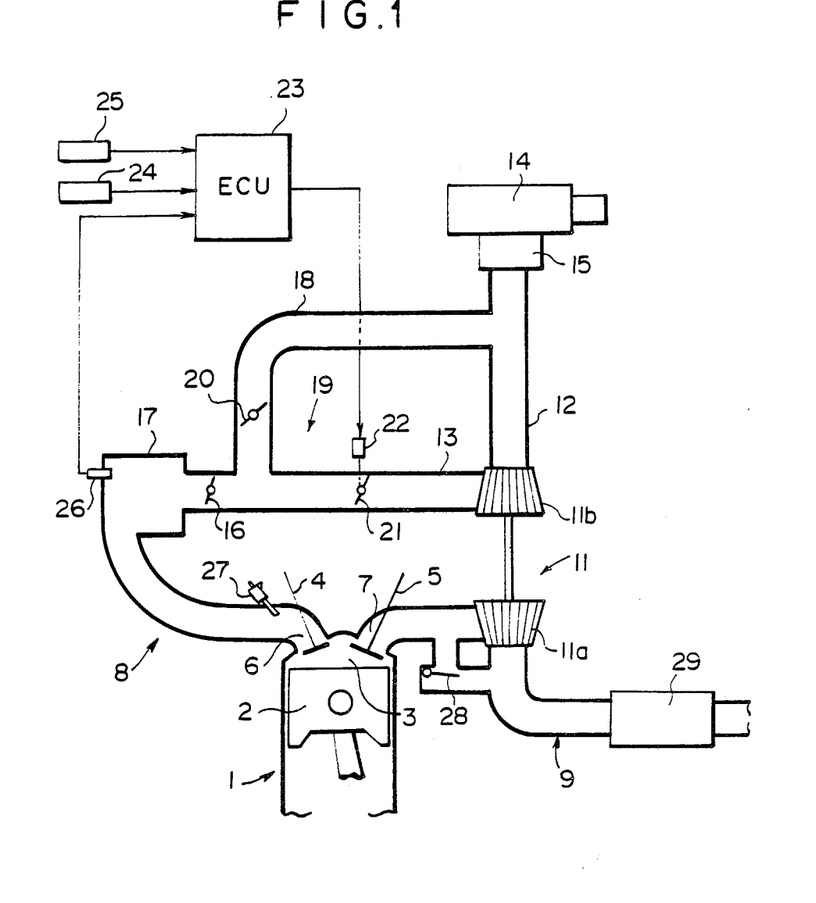
FIG. 1 is a schematic view showing a turbocharged engine in accordance with a first embodiment of the present invention.

In FIG. 1, a turbocharged engine 1 in accordance with an embodiment of the present invention has a combustion chamber 3 defined above a piston 2. Intake and exhaust ports 6 and 7 opened and closed respectively by intake and exhaust valves 4 and 5 open to the combustion chamber 3. An intake passage 8 is connected to the intake port 6 and an exhaust passage 9 is connected to the exhaust port 7.

The engine 1 is provided with a turbocharger 11 comprising an impeller 11b which is disposed in the intake passage 8 and is driven by a turbine 11a disposed in the exhaust passage 9. An air cleaner 14 is provided on the upstream end of the intake passage 8 and an airflow meter 15 is disposed in the intake passage 8 downstream of the air cleaner 14. A bypass passage 18 connects a portion of the intake passage 8 upstream of the impeller 11b with a portion of the intake passage 8 downstream of the impeller 11b bypassing the impeller 11b, i.e., the bypass passage 18 directly connects a portion of the intake side passage 12 of the impeller 11b with a portion of the discharge side passage 13 of the same. The discharge side passage 13 leads to the intake port 6 by way of a throttle valve 16 and a surge tank 17. The amount of air introduced into the impeller 11b and the amount of air introduced into the bypass passage 18 are controlled by a valve means 19. The valve means 19 comprises a bypass valve 20 disposed in the bypass passage 18 and a flow control valve 21 disposed in the discharge side passage 13 of the impeller 11b. The bypass valve 20 is a check valve and the flow control valve 21 is driven by an actuator 22. The opening of the flow control valve 21 is controlled according to the operating condition of the engine 1 under the control temperature signal from a coolant temperature sensor 24, an engine rpm signal from an engine speed sensor 25 and an intake pressure signal from a pressure sensor 26 are input into the engine control unit 23, the intake pressure signal representing the pressure in the intake passage 8 downstream of the throttle valve 16.

A fuel injection valve 27 is provided in the intake passage 8 near the intake port 6. The exhaust passage 9 is provided with a bypass passage which bypasses the turbine 11a of the turbocharger 11 and is selectively opened by a waste gate valve 28, and a catalytic convertor 29 is disposed downstream of the turbine 11a.

The engine control unit 23 obtains a signal representing flow of exhaust gas from the engine rpm and the intake pressure, and fully opens the flow control valve 21 and fully closes the bypass valve 20 during heavy load operation so that only pressurized air pressurized by the impeller 11b is introduced into the combustion chamber 3.

On the other hand, when the engine load is light, the flow control valve 21 is partly closed within a range below the surging line and the bypass valve 20 is opened under the force of intake vacuum, whereby natural intake occurs through the bypass passage 18. By closing the flow control valve 21 to a throttling degree higher than that of the throttle valve 16, the rpm of the turbine 11a is kept high to improve acceleration response.

Figure 2:
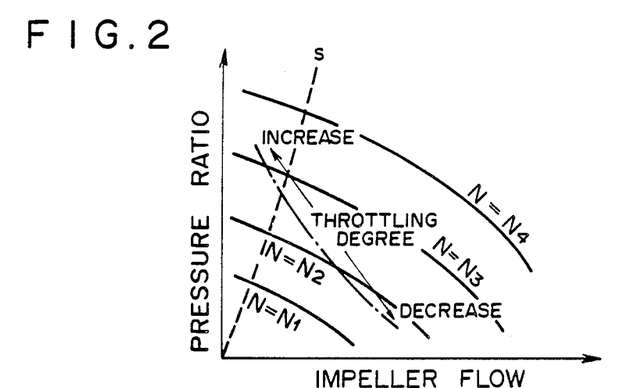
FIG. 2 shows characteristic curves illustrating the relation between the opening of the flow control valve and the engine rpm with respect to the relation between the impeller flow and the ratio of the pressure on the intake side of the impeller and the pressure on the discharge side of the same.

In FIG. 2, each solid line shows a relation ratio of the pressure in the intake side passage 12 to the pressure in the discharge side passage 13 (i.e., the ratio of pressure upstream of the impeller to the pressure downstream of the impeller; this ratio will be simply referred to as the pressure ratio, hereinbelow) which obtains when the turbine speed is fixed to a certain rpm N (N1 to N4), N1 to N4 descending in this order. On the other hand, when the throttling degree of the flow control valve 21 is changed with the amount of exhaust gas flowing into the turbine 11a fixed, the turbine rpm is increased with the increase of the throttling degree of the flow control valve 21 or reduction of the opening of the same as shown by the chained line in FIG. 2. As the throttling degree of the flow control valve 21 is increased, the pressure ratio increases to finally exceed the surging line S shown by the dotted line in FIG. 2. In accordance with this invention, the opening of the flow control valve 21 is reduced or the throttling degree of the same is increased within a range below the surging line S.

Figure 3:
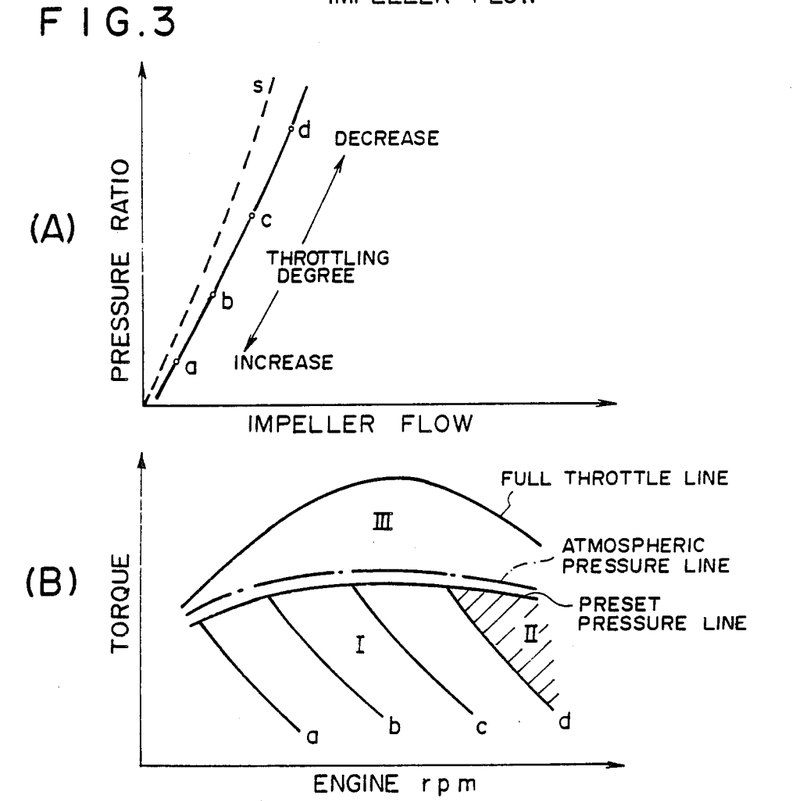
FIGS. 3A and 3B are views illustrating an example of the control exerted on the throttling degree of the flow control valve with respect to the operating condition of the engine.

In this particular embodiment, a setting line is set to extend along the surging line S at a light load as shown in FIG. 3A, and the opening of the flow control valve 21 is controlled in accordance with the setting line so that the throttling degree of the flow control valve 21 is reduced as the amount of exhaust gas increases (a to d in FIG. 3A) and the turbine rpm increases. Further, in a light load range I (FIG. 3B) in which the engine torque is lower than a preset pressure line which is set slightly below an atmospheric pressure line and the engine speed is relatively low in engine rpm-engine torque characteristic graphs shown in FIG. 3B, the flow control valve 21 is controlled according to the engine load to throttle the discharge side passage 13 to the throttling degree suitable for obtaining a maximum turbine rpm corresponding to the given amount of exhaust gas, lines a to d being constant exhaust gas amount lines along which the amount of exhaust gas is fixed. The opening of the flow control valve 21 may be the same so long as the amount of exhaust gas flowing into the turbine 11a is the same. That is, on the same constant exhaust gas amount line (a to d), the opening of the flow control valve 21 may be the same. In range III in which the engine torque is higher than the preset pressure line and range II in which the engine rpm is relatively high and the engine load approaches the atmospheric pressure line though the engine torque is lower than the preset pressure line, the flow control valve 21 is fully opened to prevent the turbine rpm from becoming excessively high.

Figure 4:
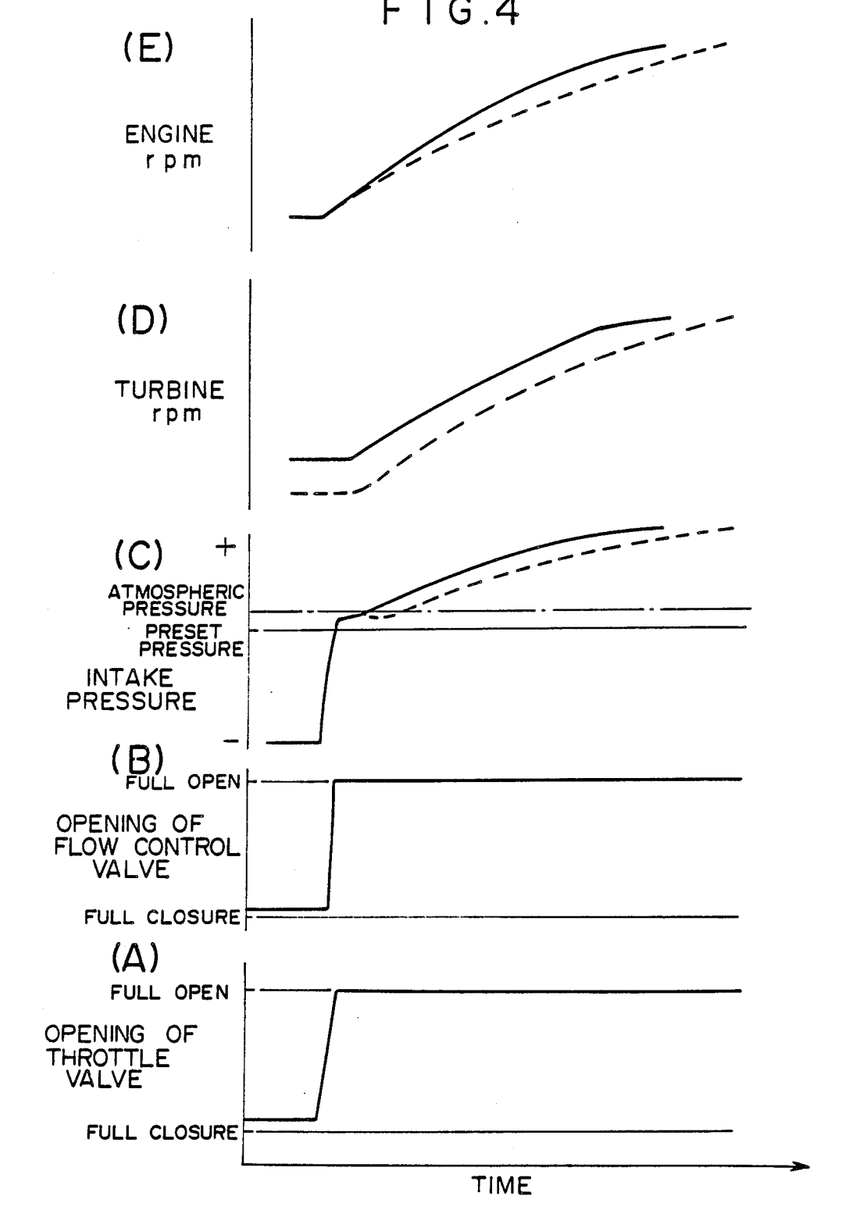
FIGS. 4A to 4E are views respectively illustrating changes in the throttle opening, the throttling degree of the flow control valve, the intake pressure, the turbine rpm and the engine rpm in the case of the embodiment together with changes of the same items in the case of a control.

During acceleration in which the throttle valve 16 is abruptly opened to full throttle from the fully closed condition as shown in FIG. 4A, the intake pressure downstream of the throttle valve 16 is abruptly increased to the atmospheric pressure from a negative pressure as shown by the solid line (while the dotted line shows the same characteristics of the engine of the prior art having no flow control valve 21) in FIG. 4C. When the intake pressure exceeds the preset pressure (which is set slightly below the atmospheric pressure as described above) before reaching the atmospheric pressure, the flow control valve 21 is fully opened from a partly closed condition as shown in FIG. 4B. The turbine rpm of the turbocharger 11 has been kept higher in the case of the engine of this embodiment than in the case of the engine of the prior art having no flow control valve 21 as respectively shown by the solid line and the dotted line in FIG. 4D. Accordingly, when the amount of exhaust gas is increased in response to opening of the throttle valve 16, the engine rpm is increased more rapidly in the case of the engine of this embodiment than in the case of the engine of the prior art as respectively shown by the solid line and the dotted line in FIG. 4E, whereby the acceleration response is improved in the case of the engine of this embodiment.

Figure 5:
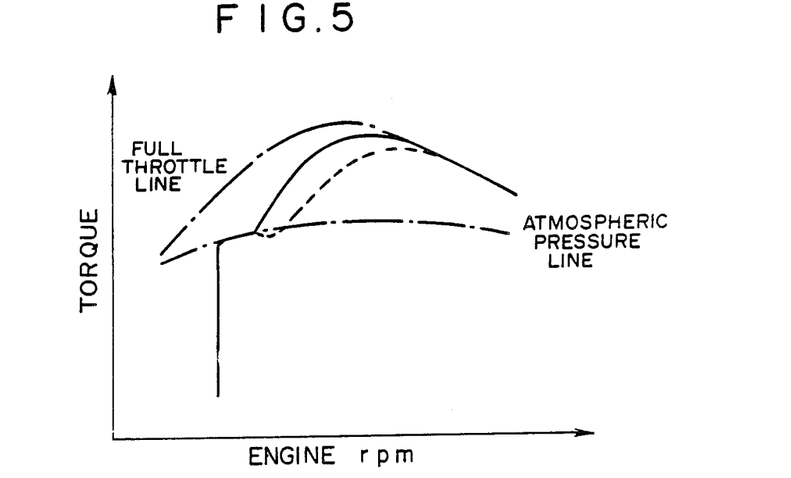
FIG. 5 is a graph showing the torque curve during acceleration in the case of the embodiment together with the same in the case of the control.

Further, as shown by the solid line in FIG. 5, the engine rpm-engine torque characteristic curve upon acceleration in the case of the engine of this embodiment builds up from the atmospheric line at a lower engine rpm than in the case of the engine of the prior art shown by the dotted line in FIG. 5.

The engine control unit 23 fully opens the flow control valve 21, thereby closing the bypass valve 20, irrespective of the engine load when the temperature of the engine coolant represented by the water temperature signal from the coolant temperature sensor 24 is lower than a predetermined value, i.e., when the engine is being warmed up. Accordingly, all the intake air is introduced into the combustion chamber 3 through the impeller 11b during warm-up of the engine. This is advantageous in that the intake air is pressurized by the impeller and heats up before being introduced into the combustion chamber 3, whereby the warm-up time is shortened.

Figure 6:
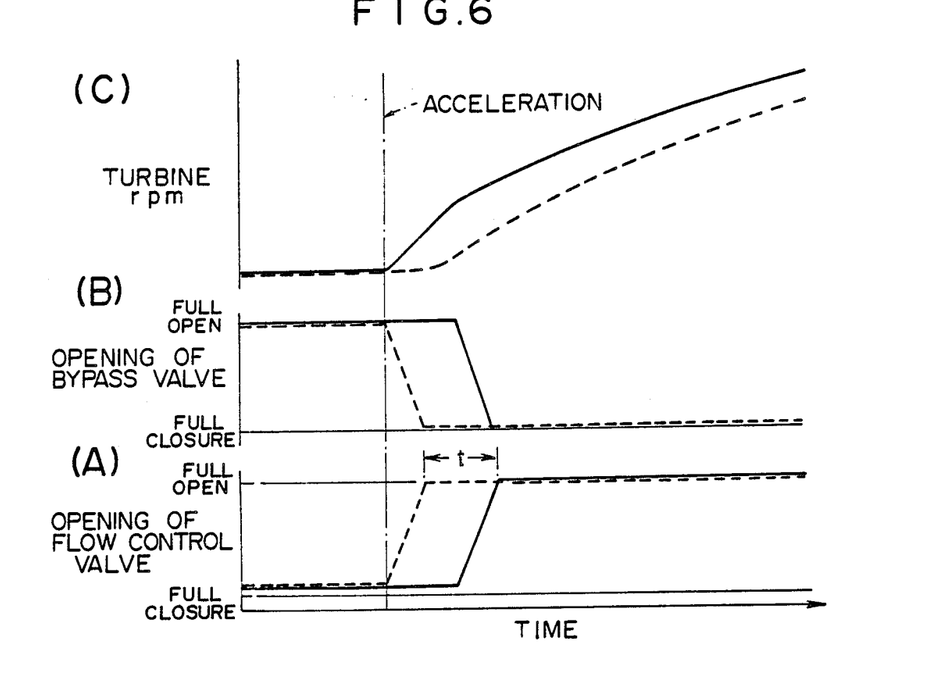
FIG. 6A to 6C are views respectively illustrating changes in the throttling degree of the flow control valve, the opening of the bypass valve and the turbine rpm during acceleration in the case of the first embodiment together with changes of the same items in the case of a control.

The engine control unit 23 detects acceleration of the vehicle through the intake pressure signal from the pressure sensor 26. That is, when the change in the intake pressure is larger than a predetermined value, the control unit 23 determines that the vehicle is being accelerated. The engine control unit 23 keeps the condition in which the flow control valve 21 is partly closed and the bypass valve 20 is fully opened for a predetermined time interval after the acceleration is detected even if the engine load becomes heavy as shown by the solid line in FIGS. 6A and 6B. The predetermined time interval corresponds to the time interval required for the amount of intake air to reach the amount corresponding to the amount taken in by natural intake at full throttle, and depends upon the degree of the acceleration, being long in the case of acceleration from a low-speed, light-load operational range of the engine and short in the case of an acceleration from a medium-load operational range.

When the engine load is light, the amount of exhaust gas for driving the turbine 11a is small and accordingly the turbine rpm cannot be kept sufficiently high to the extent that the turbine rpm can be satisfactorily quickly increased in response to operation of the accelerator. Therefore, it is preferred that the flow control valve 21 be kept partly closed with the bypass valve 20 opened until the amount of intake gas is increased and the turbine rpm is sufficiently increased. That is, by keeping the flow control valve 21 partly closed with the bypass valve 20 opened, the turbine rpm can be more quickly increased as shown by the solid line in FIG. 6C as compared with the case in which the bypass valve 20 is completely closed and the flow control valve 21 is completely opened as soon as acceleration is detected as shown by the dotted lines in FIGS. 6A and 6B, and the turbine rpm-time characteristics which are shown by the dotted line in FIG. 6C.

Now the operation of the engine control unit 23 of this embodiment will be described with reference to the flow chart shown in FIG. 7.

Figure 7:
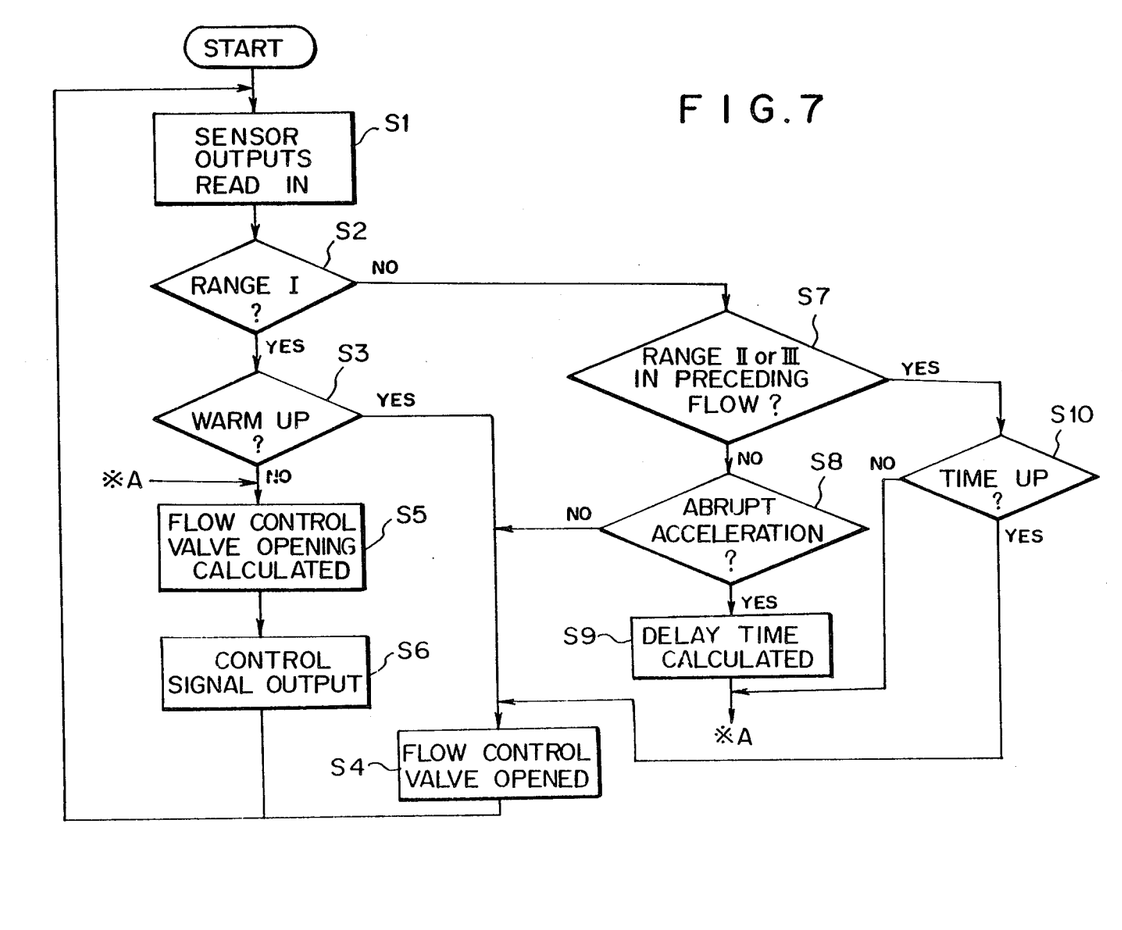
FIG. 7 is a flow chart illustrating the operation of the engine control unit in the first embodiment.

As shown in FIG. 7, the outputs of the sensors 24 to 26 are read and the operating condition of the engine is detected in step S1. Then it is determined whether the operating condition of the engine is in the range I in step S2. When it is determined that the operating condition of the engine is in the range I, it is determined whether the engine is being warmed up in step S3. When the engine is being warmed up, the flow control valve 21 is fully opened (step S4), and otherwise, the opening of the flow control valve 21 is calculated and a control signal is output to the actuator 22 of the flow control valve 21 on the basis of the calculated opening of the flow control valve 21 (steps S5 and S6). When it is not determined that the operating condition of the engine is in the range I in the step S2, or it is determined that the operating condition is in the range II or III, it is determined whether it was determined that the operating condition was in the range II or III also in the preceding flow in step S7. If not, that is, if it is determined that the operating condition enters the range II or III at this time, it is determined whether the vehicle is being abruptly accelerated in step S8. When it is not determined that the vehicle is being abruptly accelerated, the flow control valve 21 is immediately fully opened. When it is determined that the vehicle is being abruptly accelerated in the step S8, a delay time is determined in step S9 and then the engine control unit 23 proceeds to the step S5. Thus, during acceleration, the flow control valve 21 is kept partly closed until it is determined that the delay time has elapsed in step S10. As described above, the delay time is determined depending upon the degree of the acceleration.

The flow control valve 21 may be disposed in the intake side passage 12 of the impeller 11b instead of the discharge side passage 13. The bypass valve 20 need not be limited to the check valve but may be a valve which opens and closes the bypass passage 18 in response to the flow control valve 21. Further, instead of separately providing the bypass valve 20 and the flow control valve 21, a switching valve may be provided at one of the junctions of the bypass passage 18 to the intake passage 8. Acceleration may be detected by way of change in the opening of the throttle valve 16 or the amount of depression of the accelerator pedal instead of change in the intake pressure downstream of the throttle valve 16.

In a turbocharged engine in accordance with another embodiment of the present invention shown in FIGS. 8 to 13, the flow control valve and the bypass valve are both opened during a light load high speed operation of the engine, and at the same time, the flow control valve is partly closed, when a deceleration is detected, a predetermined delay time after detection of the deceleration for the reasons described above.

Figure 8:
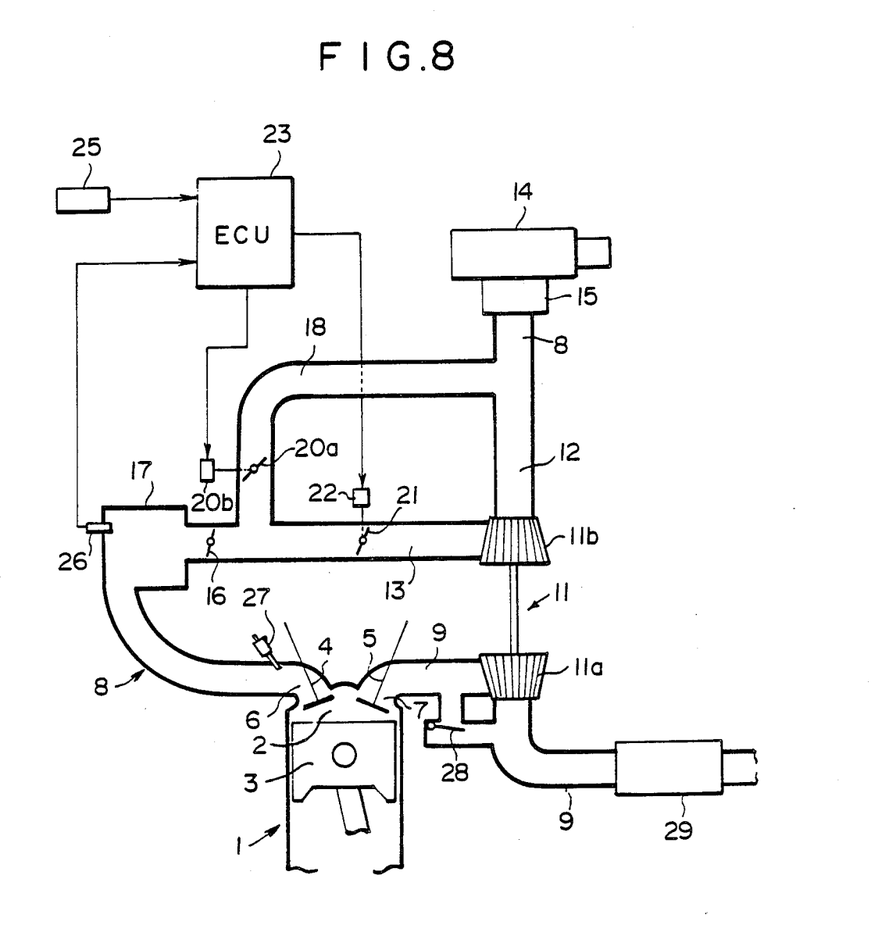
FIG. 8 is a schematic view showing a turbocharged engine in accordance with a second embodiment of the present invention.

In FIG. 8, the turbocharged engine of this embodiment is mechanically substantially the same as the turbocharged engine shown in FIG. 1 except that the bypass valve 20a is driven by an actuator 20b, and accordingly the parts analogous to the parts of FIG. 1 are given the same reference numerals and will not be described here.

Figure 9:
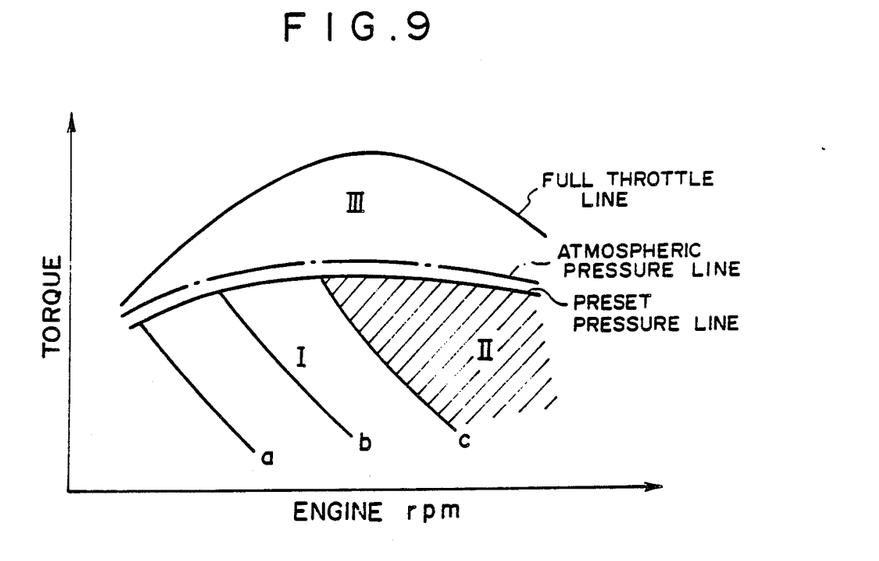
FIG. 9 is a view similar to FIG. 3B but illustrating an example of control to be exerted on the throttling degree of the flow control valve with respect to the operating condition of the engine in the second embodiment.
Figure 10:
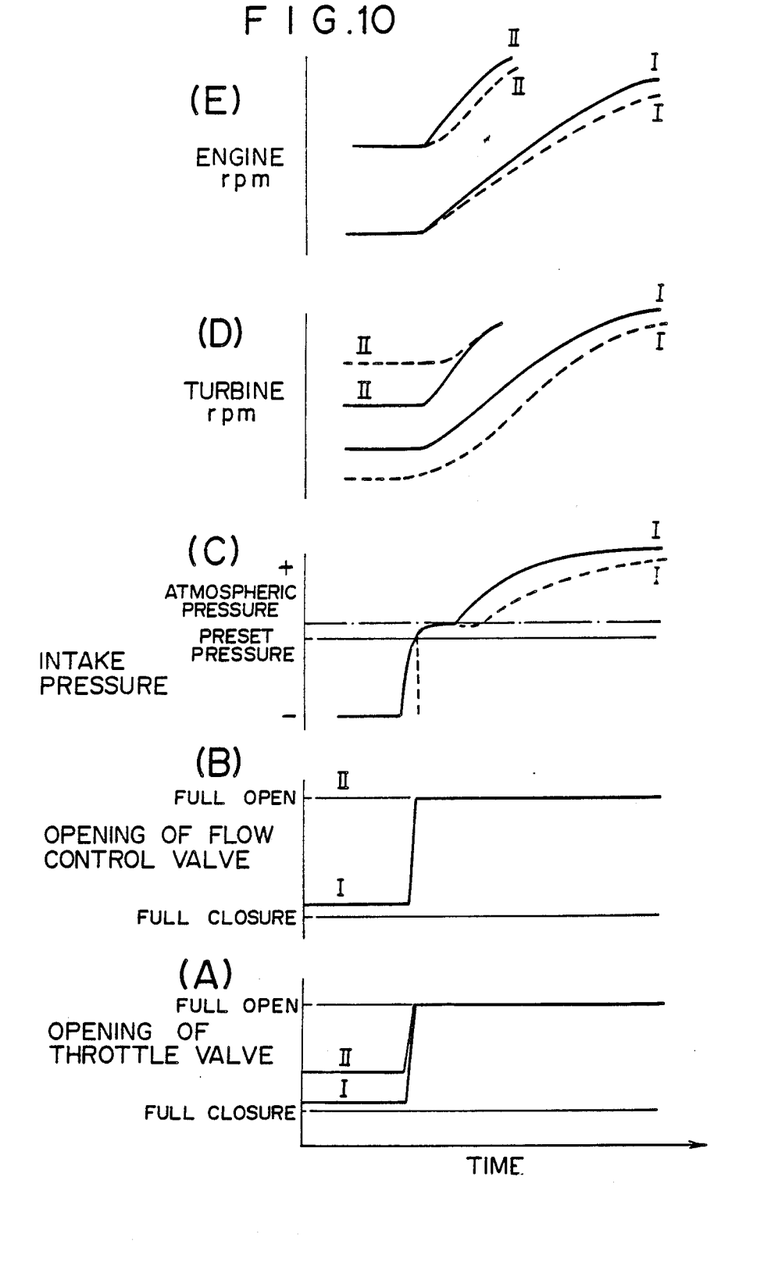
FIGS. 10A to 10E are views of the second embodiment similar to FIGS. 4A to 4E.

In this embodiment, the operating range of the engine is divided into a light-load, low-speed range I, a light-load, high-speed range II and a heavy-load range as shown in FIG. 9. In the light-load, low-speed range I, the engine control unit 3 controls the actuator 20b of the bypass valve 20a and the actuator 22 of the flow control valve 21 to open the bypass passage 18 and throttle the discharge side passage 13 of the impeller 11b in the manner described above in conjunction with the embodiment shown in FIG. 1. In the heavy-load range III, the bypass valve 20a is closed and the flow control valve 21 is fully opened. In the light-load, high-speed range II, the engine control unit 23 controls the actuator 20b of the bypass valve 20a and the actuator 22 of the flow control valve 21 to open both the bypass passage 18 and the discharge side passage 13 of the impeller 11b. In the light load-high speed range II, the turbine rpm is inherently high and accordingly it is preferred for the purpose of further improving the acceleration response during light-load, high-speed operation of the engine that inertia of intake air be enhanced by fully opening the flow control valve 21 so that the supercharging pressure can be quickly increased.

During acceleration from the light-load, low-speed range in which the throttle valve 16 is abruptly opened to full throttle from the fully closed condition as shown by the solid line I in FIG. 10A, the intake pressure downstream of the throttle valve 16 is abruptly increased to the atmospheric pressure from a negative pressure as shown by the solid line I (while the dotted line I shows the same characteristics of the engine of the prior art having no flow control valve 21) in FIG. 10C. When the intake pressure exceeds the preset pressure (which is set slightly below the atmospheric pressure) before reaching the atmospheric pressure, the flow control valve 21 is fully opened from a partly closed condition as shown by the solid line I in FIG. 10B. The turbine rpm of the turbocharger 11 has been kept higher in the case of the engine of this embodiment than in the case of the engine of the prior art having no flow control valve 21 as respectively shown by the solid line I and the dotted line I in FIG. 10D. Accordingly, when the amount of exhaust gas is increased in response to the opening of the throttle valve 16, the turbine rpm is increased more rapidly in the case of the engine of this embodiment than in the case of the engine of the prior art as respectively shown by the solid line I and the dotted line I in FIG. 10E, whereby the acceleration response is improved in the case of the engine of this embodiment.

During acceleration from the light-load, high-speed range in which the throttle valve 16 is abruptly opened to full throttle from a predetermined opening as shown by the solid line II in FIG. 10A, the flow control valve 21 is kept fully opened as shown by the solid line II in FIG. 10B. The turbine rpm of the turbocharger 11 in the case of the engine of this embodiment has been kept lower than that in the case of the engine of the prior art having no flow control valve 21 as respectively shown by the solid line II and the dotted line II in FIG. 10D, though being higher that shown by the solid line I. Accordingly, when the amount of exhaust gas is abruptly increased in response to opening of the throttle valve 16 and closure of the bypass valve 20a, the turbine rpm begins to increase earlier in the case of the engine of this embodiment than in the case of the prior art, whereby the engine rpm is increased more rapidly in the case of the former than in the case of the latter as respectively shown by the dotted line II in FIG. 10E. Thus the acceleration response is improved in the case of the engine of this embodiment.

Figure 11:
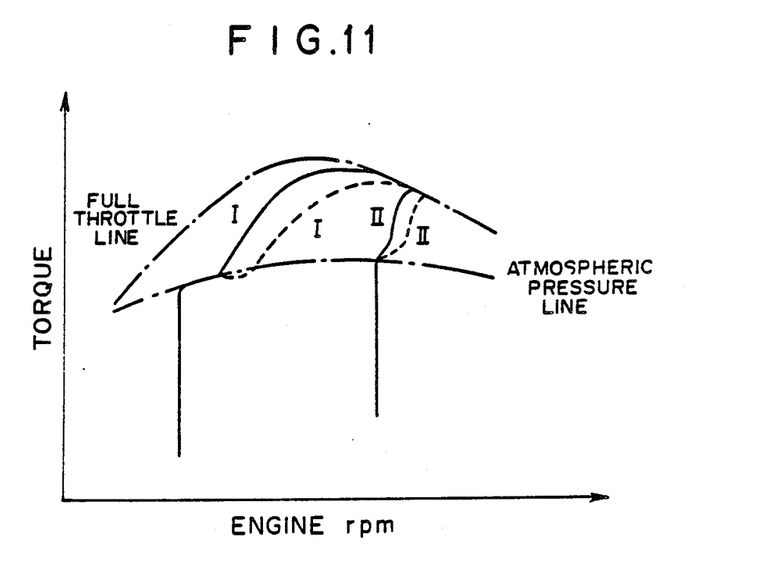
Figure 12:
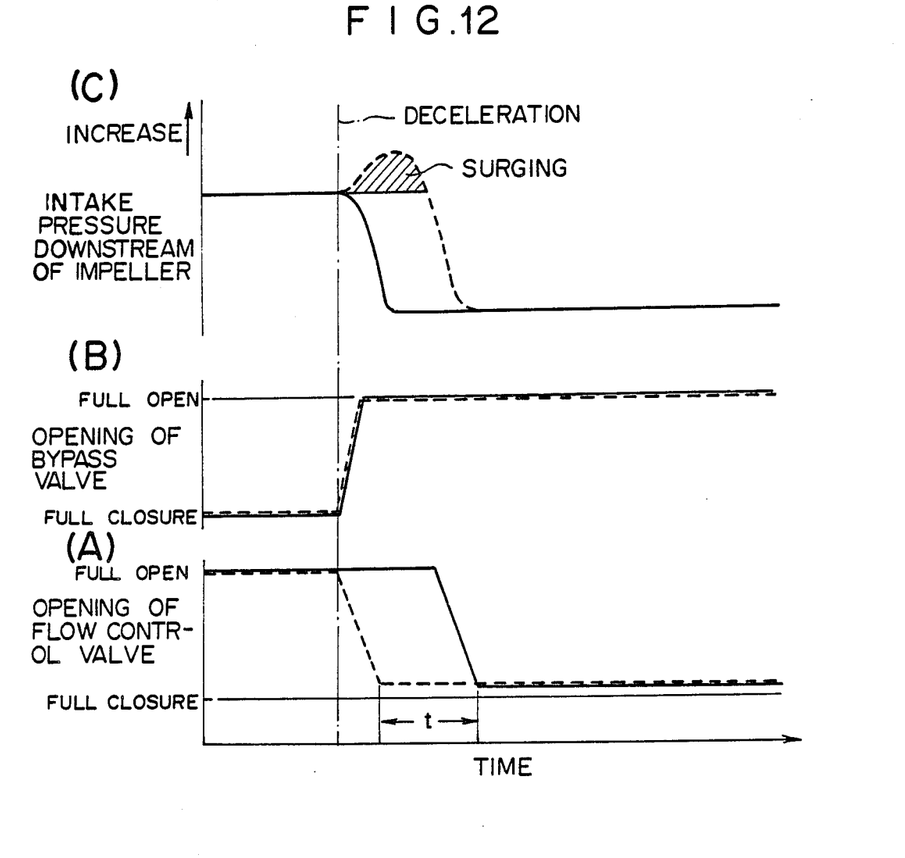

Further, as shown in FIG. 11, the engine rpm-engine torque characteristic curves upon acceleration from the light-load, low-speed range (solid line I) and acceleration from the light-load, high-speed range (solid line II) in the case of the engine of this embodiment build up from the atmospheric line at a lower engine rpm than those in the case of the engine of the prior art shown by the dotted lines I and II in FIG. 11.

The engine control unit 23 detects deceleration of the vehicle through the intake pressure signal from the pressure sensor 26. That is, when the change in the intake pressure is not larger than a predetermined value, the control unit 23 determines that the vehicle is being decelerated. The engine control unit 23 opens the bypass valve 20a and keeps the flow control valve 21 fully opened for a predetermined time interval after the deceleration is detected even if the engine load becomes light. The predetermined time interval depends upon the degree of the deceleration, being long in the case of deceleration from a high-speed range and short in the case of deceleration from a low speed range.

A sufficient amount of air has come to flow through the bypass passage 18 by the end of the predetermined time interval and the pressure ratio is prevented from excessively increasing to such an extent that the turbo characteristic exceeds the surging line.

During deceleration in which the throttle valve 16 is abruptly closed to the fully closed condition from the full throttle position, the flow control valve 21 is not closed to throttle the discharge side passage 13 immediately after detection of the deceleration in this embodiment but is kept fully opened for a predetermined time interval t, that is, is closed the predetermined time after detection of the deceleration as shown by the solid line in FIG. 12A. The dotted line in FIG. 12A shows the same characteristics in the case of a control in which the flow control valve 21 is closed immediately after detection of the deceleration. On the other hand, the bypass valve 20a is fully opened immediately after detection of the deceleration as shown by the solid line in FIG. 12B as in the control shown by the dotted line in FIG. 12B. In the control, the intake pressure downstream of the impeller 11b is abruptly increased into the surging range early in the deceleration as shown by the dotted line in FIG. 12C. On the other hand, in the case of this embodiment, the intake pressure downstream of the impeller 11b is smoothly reduced after detection of the deceleration without entering into the surging range by virtue of the fact that the flow control valve 21 is kept fully opened for the predetermined time interval as shown by the solid line in FIG. 12C.

Operation of the engine control unit 23 in this embodiment will be described hereinbelow with reference to the flow chart shown in FIG. 13.

Figure 13:
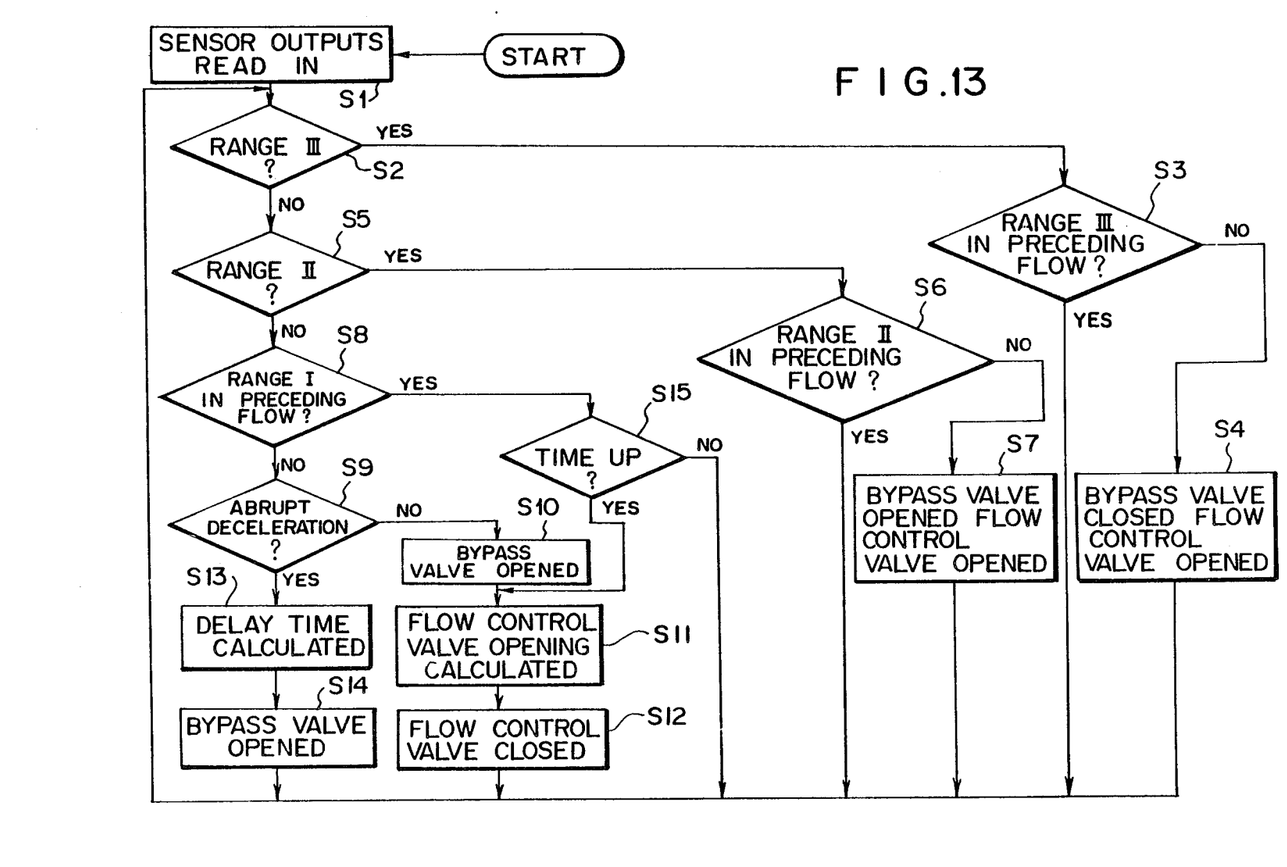
FIG. 13 is a flow chart illustrating the operation of the engine control unit employed in the second embodiment.

As shown in FIG. 13, the outputs of the sensors 25 and 26 are read and the operating condition of the engine is detected in step S1. Then it is determined whether the operating condition of the engine is in the range III in step S2. When it is determined that the operating condition of the engine is in the range III, it is determined whether it was determined that the operating condition was in the range III also in the preceding flow in step S3. When it is not determined that it was determined that the operating condition was in the range III also in the preceding flow, that is, when it is determined that the operating condition is changed to the range III from this flow, the bypass valve 20a is closed and the flow control valve 21 is fully opened (step S4), and otherwise, the engine control unit 23 returns to the step S1. When it is not determined that the operating condition is in the range III in the step S2, it is determined whether the operating condition of the engine is in the range II in step S5. When it is determined that the operating condition of the engine is in the range II, it is determined whether it was determined that the operating condition was in the range II also in the preceding flow in step S6. When it is not determined that it was determined that the operating condition was in the range II also in the preceding flow, that is, when it is determined that the operating condition is changed to the range II from this flow, both the bypass valve 20a and the flow control valve 21 are fully opened (step S7), and otherwise, the engine control unit 23 returns to the step S1. When it is not determined that the operating condition is in the range II in the step S5, or it is determined that the operating condition is in the range I, it is determined whether it was determined that the operating condition was in the range I also in the preceding flow in step S8. If not, that is, if it is determined that the operating condition enters the range I from this flow, it is determined whether the vehicle is being abruptly decelerated in step S9. When it is not determined that the vehicle is being abruptly decelerated, the bypass valve 20a is immediately fully opened in step S10 and the opening of the flow control valve 21 is calculated in step S11. Then a control signal is output to the actuator 22 of the flow control valve 21 to close the flow control valve 21 to the calculated opening (steps S11 and S12). When it is determined that the vehicle is being abruptly decelerated in the step S9, a delay time is determined and the bypass valve is opened (steps S13 and 14) Thus, during deceleration, the flow control valve 21 is kept fully opened until it is determined that the delay time has elapsed in step S15. As described above, the delay time is determined depending upon the degree of the deceleration. Deceleration may be detected by way of change in the opening of the throttle valve 16 or the amount of depression of the accelerator pedal instead of change in the intake pressure downstream of the throttle valve 16.

Though, in the first and second embodiments, the valve is controlled on the basis of the intake pressure downstream of the throttle valve 16, it may be controlled according to the exhaust pressure, for instance, which is related to the flow of exhaust gas.

What is claimed:

1. A turbocharged engine comprising an impeller in the intake system of the engine to be driven by a turbine provided in the exhaust sytem of the engine; a main throttle valve means for controlling output of the engine; a bifurcated intake passage means having a first passage portion and a second passage portion upstream of said main throttle valve, the outlet of the first passage portion and the outlet of the second passage portion joining together upstream of the main throttle valve means, said first passage portion bypassing the impeller and said second passage portion being provided with said impeller; a first valve means for opening the first passage portion when the engine load is light and closing the first passage portion when the engine load is heavy; and a second valve means for fully opening the second passage portion when the engine load is heavy and slightly opening the second passage portion when the engine load is light, the impeller and the second valve means are disposed in series within the second passage portion such that the second valve means is disposed downstream of the outlet of the impeller, the outlet of the first passage portion communicating with the second passage portion downstream of the second valve means, the inlet of the second passage portion disposed upstream of the inlet of the impeller joining with the inlet of the first passage portion, the throttling degree of the second valve means being controlled so as to be higher than that of said main throttle valve means when the engine load is light.

2. A turbocharged engine as defined in claim 1 further comprising a control means for controlling the throttling degree of the second valve means to be reduced as the flow exhaust gas to the turbine increases during the light-load, low speed operation of the engine.

3. A turbocharged engine as defined in claim 2 in which said control means closes the first valve means and opens the second valve means during light-load, high-speed operation of the engine.

4. A turbocharged engine as defined in claim 1 further comprising a control means for closing the first valve means and opening the second valve means irrespective of the engine load during warm-up of the engine.

5. A turbocharged engine as defined in claim 1 further comprising a control means for opening the second valve means and closing the first valve means a predetermined time interval after detection of the acceleration.

6. A turbocharged engine as defined in claim 5 in which said predetermined time interval is lengthened as the engine load upon detection of the acceleration is lowered.

7. A turbocharged engine as defined in claim 2 further comprising a control means for immediately opening the first valve while keeping the second valve fully opened for a predetermined time interval and partly closing it thereafter.

8. A turbocharged engine as defined in claim 7 in which said predetermined time interval is longer in a decleration from a high-speed range than a decleration from a low-speed range.

9. A turbocharged engine as defined in claim 2 further comprising a control means for opening both the first and second valve means during a light-load, high-speed operation.

10. A turbocharged engine as defined in claim 2 in which the division between said light engine load and heavy engine load is at an engine load at which the pressure in the intake passage is substantially equal to atmospheric pressure.

11. A turbocharged engine comprising an impeller in the intake system of the engine to be driven by a turbine provided in the exhaust system of the engine; a main throttle valve means for controlling output of the engine; an intake passage means having a first passage portion and a second passage portion upstream of said main throttle valve, the outlet of the first passage portion and the outlet of the second passage portion joining together upstream of the main throttle valve means, said first passage portion bypassing the impeller and said second passage portion being provided with said impeller; a first valve means for opening the first passage portion when the engine load is light and closing the first passage portion when the engine load is heavy; and a second valve means for fully opening the second passage portion when the engine load is heavy and slightly opening the second passage portion when the engine load is light, the impeller and the second valve means being disposed in series within the second passage portion such that the second valve means is disposed downstream of the outlet of the impeller, the outlet of the first passage portion communicating with the second passage portion downstream of the second valve means, the inlet of the second passage portion disposed upstream of the inlet of the impeller joining with the inlet of the first passage portion, the throttling degree of the second valve means being controlled higher than that of said main throttle valve means when the engine load is light so that the ratio of the pressure downstream of the impeller to the pressure upstream of the same increases within a range below the surging zone, which is defined in a low engine speed range and increases gradually as engine load increases, as the flow of exhaust gas increases.

12. A method of supercharging an engine comprising the steps of providing an impeller in the intake system of the engine to be driven by a turbine provided in the exhaust system of the engine; providing a main throttle valve means for controlling output of the engine; providing an intake passage means having a first passage portion and a second passage portion upstream of said main throttle valve, the outlet of the first passage portion and the outlet of the second passage portion joining together upstream of the main throttle valve means, said first passage portion bypassing the impeller and said second passage portion being provided with said impeller; providing a first valve means for opening the first passage portion when the engine load is light and closing the first passage portion when the engine load is heavy; providing a second valve means for fully opening the second passage portion when the engine load is heavy and slightly opening the second passage portion when the engine load is light; the impeller and the second valve means being disposed in series within the second passage portion such that the second valve means is disposed downstream of the outlet of the impeller, the outlet of the first passage portion communicating with the second passage portion downstream of the second valve means, the inlet of the second passage portion disposed upstream of the inlet of the impeller joining with the inlet of the first passage portion, the throttling degree of the second passage being higher than that effected by said main throttle valve means when the engine load is light.

* * * * *